United States Patent [19]

Lu et al.

[11] Patent Number: 5,232,776

[45] Date of Patent: Aug. 3, 1993

[54] POLYMERIC FILMS WITH IMPROVED LOW COEFFICIENT OF FRICTION MATERIAL COATED THEREON

[75] Inventors: Pang-Chia Lu, Pittsford; Robert E. Touhsaent, Fairport, both of N.Y.

[73] Assignee: Mobil Oil Corporation, Fairfax, Va.

[21] Appl. No.: 752,136

[22] Filed: Aug. 29, 1991

[51] Int. Cl.$^5$ .................. B32B 27/08; B32B 7/12
[52] U.S. Cl. .................. 428/349; 428/484; 428/500; 428/516; 525/163
[58] Field of Search .......... 428/349, 484, 487, 500, 428/516, 518, 910, 353, 348, 347, 517; 525/163

[56] References Cited

U.S. PATENT DOCUMENTS

| | | | |
|---|---|---|---|
| 3,753,769 | 8/1973 | Steiner | 428/331 |
| 3,843,576 | 10/1974 | Parkinson | 524/510 |
| 4,058,645 | 11/1977 | Steiner | 428/349 X |
| 4,403,464 | 9/1983 | Duncan | 428/349 X |
| 4,604,324 | 8/1986 | Nahmias et al. | 428/349 |
| 4,692,379 | 9/1987 | Keung et al. | 428/349 |
| 4,695,503 | 9/1987 | Liu et al. | 428/349 X |
| 4,749,616 | 6/1988 | Liu et al. | 428/331 |
| 4,764,425 | 8/1988 | Balloni et al. | 428/349 X |
| 4,898,787 | 2/1990 | Min et al. | 428/480 |
| 4,956,232 | 9/1990 | Balloni et al. | 428/349 |
| 4,956,233 | 9/1990 | Chu et al. | 428/484 X |
| 4,956,241 | 9/1990 | Chu et al. | 428/484 X |
| 4,965,319 | 10/1990 | Kawamoto | 525/211 X |
| 4,981,758 | 1/1991 | Chu et al. | 428/520 X |
| 5,017,430 | 5/1991 | Chu et al. | 428/353 |
| 5,032,458 | 7/1991 | Dallmann et al. | 428/447 X |

*Primary Examiner*—George F. Lesmes
*Assistant Examiner*—D. R. Zirker
*Attorney, Agent, or Firm*—Alexander J. McKillop; Charles J. Speciale; Malcolm D. Keen

[57] ABSTRACT

As a means to improve the adhesiveness of a wax coated surface on a polypropylene substrate film, so that a thermal stripe seal can be suitably adhered thereto, an adhesive promoting composition comprising a neutralized olefin-unsaturated acid ionomer, and a cross-linkable formaldehyde resin admixed into and applied to the polypropylene surface together with, an emulsion of wax and a binder therefore. The preferred ionomer is surlyn resin and the preferred cross-linkable resin is melamine-formaldehyde.

8 Claims, No Drawings

POLYMERIC FILMS WITH IMPROVED LOW COEFFICIENT OF FRICTION MATERIAL COATED THEREON

This invention relates to polymeric films, particularly to films of thermoplastic polymers which have improved surface slip characteristics. It more specifically refers to such films which have both a high surface slip characteristic and good heat sealability.

BACKGROUND OF THE INVENTION

Films of thermoplastic polymers are well known and widely used in the packaging industry because of their superior physical properties. Included among these well known, commercially available thermoplastic polymers, which have been found to be useful for film applications, are polyolefins, particularly poly(lower) olefins. Exemplary of the conventional film forming polymers of this type are those which have been formed by the addition polymerization of ethylene and propylene individually as homopolymers, together as a copolymer and as copolymers with other, higher olefins, particularly higher alpha olefins.

Polypropylene films, particularly oriented polypropylene films, have found wide acceptance in the packaging arts. This is because of their high tensile modulus and stiffness, their excellent optical clarity, and their good moisture barrier characteristics.

However, one of the advantages of using thermoplastic polymer films in the packaging industry is that they are heat sealable, and oriented polypropylene is not readily heat sealed. Therefore, without modification, this otherwise excellent film would not have wide acceptance in this field. Therefore, the practice has developed of applying a layer of more readily heat sealable material to the surface, or surfaces, of the oriented polypropylene film which are intended to be heat sealed. This layer, which may be applied to a whole surface or any part thereof, has sometimes been called a thermal stripe seal.

Thus, oriented polypropylene film is an excellent packaging material, and, with the stripe seal applied thereto, is nicely heat sealable, and therefore has achieved wide acceptance in the packaging field. This film still has a disadvantages in that, with or without the stripe seal disposed thereon, it has a very high inherent coefficient of surface friction, and a high film to film blocking characteristic, particularly during storage. The high surface friction characteristic causes the film to run with some difficulty, particularly at high speeds, because the film tends to drag against itself and other surfaces.

In the past, these adverse surface characteristics of polypropylene have been sought to be modified by various techniques. In U.S. Pat. No. 4,956,241, there is disclosed the addition, by slip coating a wax emulsion onto the surface of the polypropylene film. In particular, according to this patent, the wax emulsion should be applied to an oriented polypropylene film, and most especially, it should be applied to the film between the machine direction and the transverse direction orientation steps.

The waxes which have been used to improve the surface slip characteristics of the polypropelene film include the usual materials, such as carnauba wax, paraffin wax, polyethylene wax, micro-crystalline wax, and the like. Blends of these waxes are contemplated.

It is also suggested in this patent to possibly use, in combination with the wax, a polymeric binding agent for the wax. This binder is described as a polymer having a glass transition point between about 30° and 100° C. It is said to be used in amounts between about 0 and 50 % of the total weight of the wax. One example of such a polymer which is set forth in an example of this reference is an acrylic resin composed of a copolymer of methyl methacrylate, methacrylic acid and methyl acrylate.

Additional components of the wax formulation include conventional inorganic slip agents, such as silica or talc. Conventional emulsifiers, or suspending agents, and a conventional carrier, such as water, are used to assemble the wax composition into a suitable emulsion or suspension so that it can be applied to the surface of the polymer film.

It has been noted in the past that polypropylene films should be biaxially oriented in order to get the most out of their physical properties. Such orientation may be accomplished by conventional operations, such as bubble orientation, or tenter frame orientation. The particular type of orientation which is used is a matter of choice to the operator. However, where slip agents have been applied in the past, there seems to have been a preference for the use of a sequential machine direction/transverse direction orientation procedure, with the slip agent applied between the two orientation steps.

As noted above, polymeric films which are suited to use in the packaging industry, are valuable for many reason. Not the least of the values of using thermoplastic films for packaging is the fact that these films are heat sealable. However, it has been found that the modification of the surface characteristics of polypropylene films to improve their slip characteristics, by the application of wax thereto, has also degraded the heat seal which is accomplished through the thermal stripe seal described above. That is, the successful efforts which have been made in order to improve the film surface slip characteristics, and to reduce the blocking tendency thereof, particularly the tendency to block on storage of oriented polypropylene films, have degraded the heat sealability of these films through the above referred to thermal stripe. Of course this is undesirable.

OBJECTS AND BROAD STATEMENT OF THIS INVENTION

It is therefore an object of this invention to provide a thermoplastic polymeric film having both good overall properties, including good heat sealability, as well as good surface slip characteristics.

It is another object of this invention to provide a novel composition, suitable for applying to the surface of a polymeric film which will cause the surface to have good slip and anti-blocking characteristics, and which will improve the adhesion of a thermal stripe seal material to this modified surface It is a further object of this invention to provide an improved oriented polypropylene having desirable heat sealing as well as surface friction characteristics.

Other and additional objects of this invention will become apparent from a consideration of this entire specification, including the claims appended hereto.

In accord with and fulfilling these objects, one important aspect of this invention resides in a composition comprising a wax, a resinous binder for the wax, and an adhesion promotor, admixed in suitable proportions, and preferably carried in a suitable carrier fluid containing conventional suspending and/or emulsifying agents. The wax, resinous binder, carrier fluid and suspending and/or emulsifying agents used in this invention are substantially conventional. It is the addition of the adhesion promotor to these conventional components which allows the composition of this invention to impart to the surface of the polymeric film the improved characteristics which have been desired by this art.

According to this invention, the adhesion promotor which is used herein is one or more compounds which do not substantially diminish the sliding characteristics of the wax composition to which they have been added, but which cause this composition to allow a seal stripe, or the like, to be adherently disposed on at least selective portions of the surface of a thermoplastic polymer, particularly an oriented polypropylene, film, which has had a wax composition applied thereto. According to one aspect of this invention, a suitable adhesion promotor is a combination of a copolymer of an unsaturated carboxylic acid and a lower olefin, and a cross-linkable resin.

The olefin-unsaturated acid copolymer which is used in the improvement according to this invention will, by itself, improve the adhesion of a thermal stripe seal to the wax coated surface of the polymer film. However, such copolymers are usually tacky, and this condition is detrimental to maintaining the desired sliding characteristics for which the wax was applied. Therefore, the improved wax coating composition of this invention also includes a cross-linkable resinous material therewith, which tends to reduce the tackiness thereof. The proportion of the cross-linkable resin is such that it will not reduce the adhesion improving characteristic of the olefin copolymer, but such that it will reduce the inherent tackiness which will be imparted to the entire composition by the olefin copolymer.

The olefin-unsaturated acid copolymer component of the instant improved composition is to be used in admixture with the conventional wax emulsion composition. Therefore, it should be soluble or emulsifiable in the same composition. It has been found that the copolymer is soluble in its acid form if the carrier fluid contains ammonium moieties and if the pH of the composition is maintained on the basic side, e. g. above about 8. It is also within the compass of this invention to provide the olefinic copolymer in the salt form, in which case it should be readily soluble in most carrier fluids.

Additionally, it should be noted that the wax composition, which is being modified according to this invention, already contains a resinous binder, suitably an acrylic resinous binder. The adhesion promoting additive being referred to herein is in addition to, and not instead of, the acrylic binder in the conventional wax formulation.

Reference is here once again made to U.S. Pat. No. 4,956,241. The entire subject matter of this patent is incorporated herein by reference. This patent fully describes the conventional wax surface coating on oriented polypropylene film, which is the starting point of this invention.

The adhesion promotor of this invention has been described as an ionomer copolymer of a lower olefin and an unsaturated carboxylic acid in the salt form. Exemplary lower olefins include ethylene, propylene, butene-1 and admixtures thereof with each other as well as with higher alpha olefins, such as hexene-1, octene-1 and/or decene-1. Exemplary unsaturated carboxylic acids include acrylic acid, methacrylic acid, itaconic acid, fumaric acid, crotonic acid and the like.

It is preferred that the copolymers used in this service comprise about 1 to 99 weight percent of the lower olefin containing component and about to 99 weight percent of the unsaturated acid component. Preferred proportions are 5 to 90 % each of olefin and unsaturated acid. The proportion of olefin, as compared to olefinically unsaturated acid, should be determined by considering the ultimate properties of the copolymer which are desired to be achieved. The copolymer must assist in enhancing the adhesiveness of the waxed surface of the substrate film, but it must also be a composition which is compatible with the composition from which the wax is deposited on the substrate film surface.

According to this invention, the ionomer is made up of an olefin and an unsaturated acid. The proportion of the olefin component in the ionomer is 5 to 60 weight percent, preferably 5 to 30 weight percent. The proportion of unsaturated acid in the ionomer is 40 to 95 weight percent, preferably 70 to 95 weight percent.

The copolymers should have sufficient of its acid groups neutralized so as to be able to be put up in the composition from which the wax will be deposited on the substrate film surface. Therefore, at least some of the acid groups of the copolymer should be in the salt form. Suitable salts include the sodium, magnesium, ammonium, and zinc salts, but others can be used as well. It has been found to be appropriate to neutralize at least about 90 % of the acid sites with a salt forming metal. Preferably substantially all of the acid sites should be neutralized.

In a most preferred aspect of this invention, the neutralized lower olefin-unsaturated acid copolymer is an ionomer copolymer of a lower olefin and an acrylic acid, which is a copolymer that is well known in the plastics art, and is widely commercially available. One commercially available form of such an ionomer is a copolymer of ethylene with methacrylic acid, containing about 1 to 10 weight per cent methacrylic acid, which has been neutralized.

The cross-linkable resin is suitably a copolymer of formaldehyde with one or more of the compounds that usually are used to form formaldehyde resins, such as melamine. Other materials, which are reactive with formaldehyde to form cross-linkable resins include, in addition to melamine, urea and phenol.

According to this invention, the adhesion promoting additive composition comprises the adhesion promoting, but usually tacky olefin copolymer, and the tack reducing, cross-linkable resin in relative weight proportions of about 1 to 99 weight percent, preferably 10 to 40 percent olefin polymer and about 60 to 90 percent of the cross-linkable resin. Most preferred weight proportions of these components relative to each other are about 15 to 25 weight percent olefin copolymer and about 75 to 85 weight percent of tackiness reducing cross-linkable resin.

The adhesion promotor of this invention is suitably added to the wax/binder emulsion before such is applied to the surface of the thermoplastic polymer film. Suitably, about 1 to 40 weight percent of the total adhesion promotor composition, including the cross-linkable tack reducer, based on the total weight of the wax/binder emulsion after adding the adhesion promotor composition additive thereto, is appropriately used in the composition of this invention. It is preferred that the adhesion promotor composition comprise about 2.5 to 25 weight percent of the fully formulated wax emulsion composition.

According to this invention, the purpose of the adhesive promoting composition additive is to enhance the ability to adhere a second material to the surface of a polypropylene film which has had a wax composition applied thereto. This second material is not limited to any particular composition of structure. However, in the commercial arena, it is important to adhere a thermal stripe seal to this wax modified surface. Thermal stripe seals coatings of thermoplastic polymer film, which are sometime applied in limited areas on the substrate film surface, have better heat seal characteristics than the substrate film on which they are deposited.

EXAMPLES OF THIS INVENTION

The following examples illustrate this invention. They are in no way limiting on the scope of this invention. They also express the present best mode known to the inventor for carrying out this invention. In these examples, all parts and percentages are by weight unless expressly stated to be on some other basis.

PRIOR ART EXAMPLE

A biaxially oriented polypropylene film, 0.75 mil in nominal thickness, was coated with a wax emulsion containing as its active components: 100 phr (parts by weight per hundred parts by weight of resin) of an acrylic resin binder, which was made up of a methyl methacrylate, methyl acrylate, and methacrylic acid polymer; 40 phr No. 1 carnauba wax; and 0.5 phr of talc. A conventional, solvent based polyurethane thermal stripe seal was applied over a portion of the film surface.

This product was subjected to heat sealing against itself under the following conditions: temperature 280° F.; 0.5 psi; and 2 second dwell time. The strength of the seal was measured by a conventional Instron tester, which, for this seal, was 90 grams per linear inch.

EXAMPLE 1

The same film was used in this example as was used in the Prior Art Example. It was coated with the same wax emulsion, including 0.5 phr talc, as was used in the Prior Art Example except that the emulsion also contained an adhesion promotor composition consisting of: 15 phr of melamine-formaldehyde resin, and 30 phr of an ethylene-methacrylic acid copolymer ionomer.

This product was subjected to the same heat sealing and heat seal testing as in the Prior Art Example and showed a seal strength, measured in the same way, of 240 grams per linear inch.

EXAMPLE 2

Example 1 was repeated except that the wax emulsion contained 900 phr of the same wax, 100 phr of the same acrylic binder, and 0.5 phr talc, and the adhesion promoting composition consisted of: 6 phr of the same melamine-formaldehyde resin, and 30 phr of the same ethylene-methacrylic acid copolymer ionomer. The wax emulsion was applied in the same way, as was the thermal stripe seal. The product was subjected to heat sealing and heat seal testing in the same way as the other examples, which resulted in the determination that the seal strength of this product was also 240 grams per linear inch.

The following examples show the balance of properties which are achievable by supplementing the wax coating composition with both the adhesion improving component and the tack-reducing, cross-linkable component. In these examples, the wax coating composition was substantially the same and the substrate film was also the same as in examples 1 and 2. The adhesion improving component was the same neutralized ethylene-methacrylic acid copolymer ionomer as in examples 1 and 2; and the tack-reducing component was the same melamine-formaldehyde polymer as was used in these examples. The following table 1 shows the formulations and the properties of the product coated.

TABLE 1

| Example | acrylic | wax | talc | Melamine-formaldehyde resin | ethylene-methacrylic copolymer ionomer | Coefficient of friction | T-stripe strength |
| --- | --- | --- | --- | --- | --- | --- | --- |
| 3 | 100 phr | 40 phr | 0.5 phr | 15 phr | 0 | 0.18 | 100 g/in |
| 4 | 100 phr | 40 phr | 0.5 phr | 15 phr | 30 | 0.26 | 240 g/in |
| 5 | 100 phr | 40 phr | 0.5 phr | 0 phr | 30 | 0.40 | 150 g/in |

The desired value for COF (coefficient of friction) of the coated film is 0.15–0.35, and the desired strength of the T-stripe (thermal stripe seal strength) is >200 grams/in. With the addition of both ionomer and tack reducer the best properties were achieved.

For this formulation, the coating weight should be maintained at >0.15 g/1000 in$^2$, preferably at >0.2 g/1000 in$^2$. Films with lower coating weight will have poorer properties.

According to this invention, it is also possible to achieve the desired balance of low coefficient of friction and high strength of adhesion of the stripe seal. In this aspect of this invention, the amount of wax is substantially increased, while the amount of adhesion improving component may be decreased. However, in this aspect of this invention, the total coating weight should also be decreased.

Accordingly, where the wax content of the coating composition is increased to about 700 to 1100 phr, the concentration of the adhesion improving component can be decreased to about 15 to 40 phr, with all of the other components being maintained within about the same range as specified above. In this formulation, the coating weight should be maintained at less than about 0.15 g/1000 in$^2$, preferably less than about 0.1 g/1000 in$^2$.

The following is an example of the practice of this aspect of this invention.

EXAMPLE 6

The following formulation was prepared:
100 phr acrylic emulsion
900 phr wax emulsion
5 phr melamine-formaldehyde resin
25 phr ethylene-methacrylic acid (neutralized)
0.5 phr talc When applied to the same polypropylene film, as in the other examples above, in an amount of about 0.1 g/1000 in$^2$, the coefficient of friction was found to be 0.19 and the adhesion strength was found to be 225g/in.

What is claimed is:

1. In a thermoplastic polymer film having disposed on at least a portion of at least one surface thereof a friction reducing amount of a wax composition comprising wax and a binder therefore, and, disposed on at least a portion of the surface of said friction reducing composition directed away from said film, a thermal stripe seal adapted to be heat sealed;

the improvement which comprises said friction reducing composition further containing about 1 to 40 weight percent, based on said wax composition, of an additive composition comprising:

A) about 1 to 99 weight percent, sufficient to increase the adhesion of said thermal stripe seal, but also sufficient to increase the tackiness of said friction reducing composition, of at least one adhesion promoting, normally tacky copolymer ionomer comprising:

I) about 5 to 60 weight percent of at least one olefin selected from the group consisting of ethylene, propylene, butene-1, hexene-1, octene-1 and decene-1, and II) about 40 to 95 weight percent of at least one ethylenically unsaturated acid selected from the group consisting of acrylic acid, methacrylic acid, itaconic acid, fumaric acid and crotonic acid at least partially neutralized with at least one member selected from the group consisting of sodium, magnesium, zinc and ammonium; and B) about 1 to 99 weight percent, sufficient to reduce the tackiness of said wax composition, of at least one cross-linkable formaldehyde resin.

2. The improved thermoplastic polymer film as claimed in claim 1 wherein said olefin component of said ionomer comprises about 5 to 30 weight percent thereof.

3. The improved thermoplastic polymer film as claimed in claim 1 wherein said unsaturated acid component of said ionomer comprises about 70 to 95 weight percent thereof.

4. The improved thermoplastic polymer film as claimed in claim 1 wherein said adhesion increasing composition comprises about 2.5 to 25 weight per cent of said wax composition.

5. The improved thermoplastic polymer film as claimed in claim 1 wherein said formaldehyde resin comprises formaldehyde reacted with at least one member selected from the group consisting of melamine, urea, and phenol.

6. The improved thermoplastic polymer film as claimed in claim 1 wherein said tackiness reducing component of said additive composition comprises about 60 to 90 weight per cent thereof.

7. The improved thermoplastic polymer film as claimed in claim 1 wherein said tackiness reducing component of said additive composition comprises about 75 to 85 weight per cent thereof.

8. The improved thermoplastic polymer film as claimed in claim 5 wherein said tackiness reducing component of said additive composition comprises melamine formaldehyde resin; said ionomer comprises ethylene-methacrylic acid copolymer; and said binder comprises a copolymer of methyl methacrylate., methyl acrylate, and methacrylic acid.

* * * * *